(12) United States Patent
Shore et al.

(10) Patent No.: US 8,196,723 B1
(45) Date of Patent: Jun. 12, 2012

(54) PNEUMATIC DAMPER

(75) Inventors: Craig Shore, Grinnell, IA (US); Aron Fleischmann, Huxley, IA (US)

(73) Assignee: Robust Systems Solutions, LLC IA (US)

( * ) Notice: Subject to any disclaimer, the term of this patent is extended or adjusted under 35 U.S.C. 154(b) by 294 days.

(21) Appl. No.: 12/618,134

(22) Filed: Nov. 13, 2009

Related U.S. Application Data

(60) Provisional application No. 61/199,217, filed on Nov. 14, 2008, provisional application No. 61/199,219, filed on Nov. 14, 2008.

(51) Int. Cl.
*F16F 5/00* (2006.01)

(52) U.S. Cl. .................................... 188/318; 188/316

(58) Field of Classification Search ............ 188/282.7, 188/282.8, 313, 318, 322.13, 322.2, 322.21, 188/316
See application file for complete search history.

(56) References Cited

U.S. PATENT DOCUMENTS

| | | | |
|---|---|---|---|
| 4,139,186 A * | 2/1979 | Postema et al. | 188/322.19 |
| 4,307,875 A | 12/1981 | Schnitzius et al. | |
| 4,497,078 A | 2/1985 | Vogel et al. | |
| 4,503,951 A | 3/1985 | Imaizumi | |
| 4,634,142 A | 1/1987 | Woods et al. | |
| 4,696,489 A | 9/1987 | Fujishiro et al. | |
| 4,718,647 A | 1/1988 | Ludwig | |
| 4,887,699 A | 12/1989 | Ivers et al. | |
| 5,069,317 A | 12/1991 | Stoll et al. | |
| 5,133,574 A | 7/1992 | Yamaoka et al. | |
| 5,218,728 A | 6/1993 | Lloyd et al. | |
| 5,234,203 A | 8/1993 | Smith | |
| 5,276,622 A | 1/1994 | Miller et al. | |
| 5,377,107 A | 12/1994 | Shimizu et al. | |
| 5,588,510 A * | 12/1996 | Wilke | 188/266.6 |
| RE35,572 E | 7/1997 | Lloyd et al. | |
| 5,697,477 A | 12/1997 | Hiramoto et al. | |
| 5,732,370 A | 3/1998 | Boyle et al. | |
| 5,775,677 A | 7/1998 | Englund | |
| 5,823,306 A | 10/1998 | de Molina | |
| 5,921,572 A | 7/1999 | Bard et al. | |
| 5,934,422 A * | 8/1999 | Steed | 188/318 |
| 5,988,330 A | 11/1999 | Morris | |
| 6,119,832 A | 9/2000 | Hofmann | |
| 6,241,209 B1 | 6/2001 | von Mayenburg et al. | |
| 6,354,556 B1 | 3/2002 | Ritchie et al. | |
| 6,361,027 B1 | 3/2002 | Lun | |
| 6,424,894 B2 | 7/2002 | St. Clair | |
| 6,454,248 B2 | 9/2002 | Pradel | |
| 6,460,839 B2 | 10/2002 | Muller | |
| 6,536,749 B1 | 3/2003 | Luhmann et al. | |
| 6,547,224 B2 | 4/2003 | Jensen et al. | |
| 6,637,732 B2 | 10/2003 | Branco et al. | |
| 6,695,294 B2 | 2/2004 | Miller et al. | |
| 6,725,983 B2 | 4/2004 | Bell | |
| 6,761,371 B1 | 7/2004 | Heyring et al. | |
| 6,837,344 B2 | 1/2005 | Miller et al. | |

(Continued)

*Primary Examiner* — Christopher Schwartz
(74) *Attorney, Agent, or Firm* — Simmons Perrine Moyer Bergman PLC

(57) ABSTRACT

Disclosed is an apparatus for providing a pneumatic damper for use with incompressible media herein described. The invention is useful as the pneumatic damper provides a range of effectively being decoupled from a system. Also disclosed is an apparatus for providing in-line, three-state, dual flow metering, high pressure relief, for use in a system utilizing compressible or incompressible media, which includes a centrally disposed magnetically homed ball with opposing axially aligned ball mating valve seats, with a high pressure relief spring deployed to control the pressure necessary to trigger high pressure relief.

7 Claims, 6 Drawing Sheets

U.S. PATENT DOCUMENTS

| | | |
|---|---|---|
| 6,845,973 B2 | 1/2005 | Ferrer |
| 6,893,009 B2 | 5/2005 | Brehm et al. |
| 6,923,433 B2 | 8/2005 | Gross et al. |
| 6,935,625 B2 | 8/2005 | Bolt et al. |
| 6,944,524 B2 | 9/2005 | Shier et al. |
| 6,957,807 B2 | 10/2005 | Zimmer et al. |
| 6,966,412 B2 * | 11/2005 | Braswell et al. ............... 188/286 |
| 7,017,720 B2 | 3/2006 | Yoshimoto |
| 7,017,893 B1 | 3/2006 | Vincenzo |
| 7,066,474 B2 | 6/2006 | Hiebert et al. |
| 7,083,163 B2 | 8/2006 | Lemmens et al. |
| 7,100,908 B2 | 9/2006 | Borgmeier et al. |
| 7,213,799 B2 | 5/2007 | Behmenburg et al. |
| 7,226,045 B2 | 6/2007 | Brookes |
| 7,252,181 B2 | 8/2007 | Lemmens |
| 7,284,644 B2 | 10/2007 | Cmich et al. |
| 7,284,766 B2 | 10/2007 | Temmerman et al. |
| 7,314,124 B2 * | 1/2008 | Martyn et al. ................. 188/318 |
| 7,413,062 B2 * | 8/2008 | Vandewal ................... 188/266.5 |
| 7,448,479 B2 * | 11/2008 | Fukuda et al. ............. 188/322.2 |
| 2003/0141638 A1 | 7/2003 | Salice |
| 2005/0040574 A1 | 2/2005 | Ivers et al. |
| 2005/0046097 A1 | 3/2005 | Kim |
| 2005/0093213 A1 | 5/2005 | Jang |
| 2005/0093265 A1 | 5/2005 | Niaura et al. |
| 2005/0133978 A1 | 6/2005 | Lemmens |
| 2005/0173214 A1 | 8/2005 | Lemmens et al. |
| 2006/0011431 A1 | 1/2006 | Furuya et al. |
| 2006/0226587 A1 | 10/2006 | Sendrea |
| 2006/0278457 A1 | 12/2006 | Schwindt |
| 2007/0246316 A1 | 10/2007 | Brunneke et al. |
| 2007/0271732 A1 | 11/2007 | Bantle et al. |

* cited by examiner

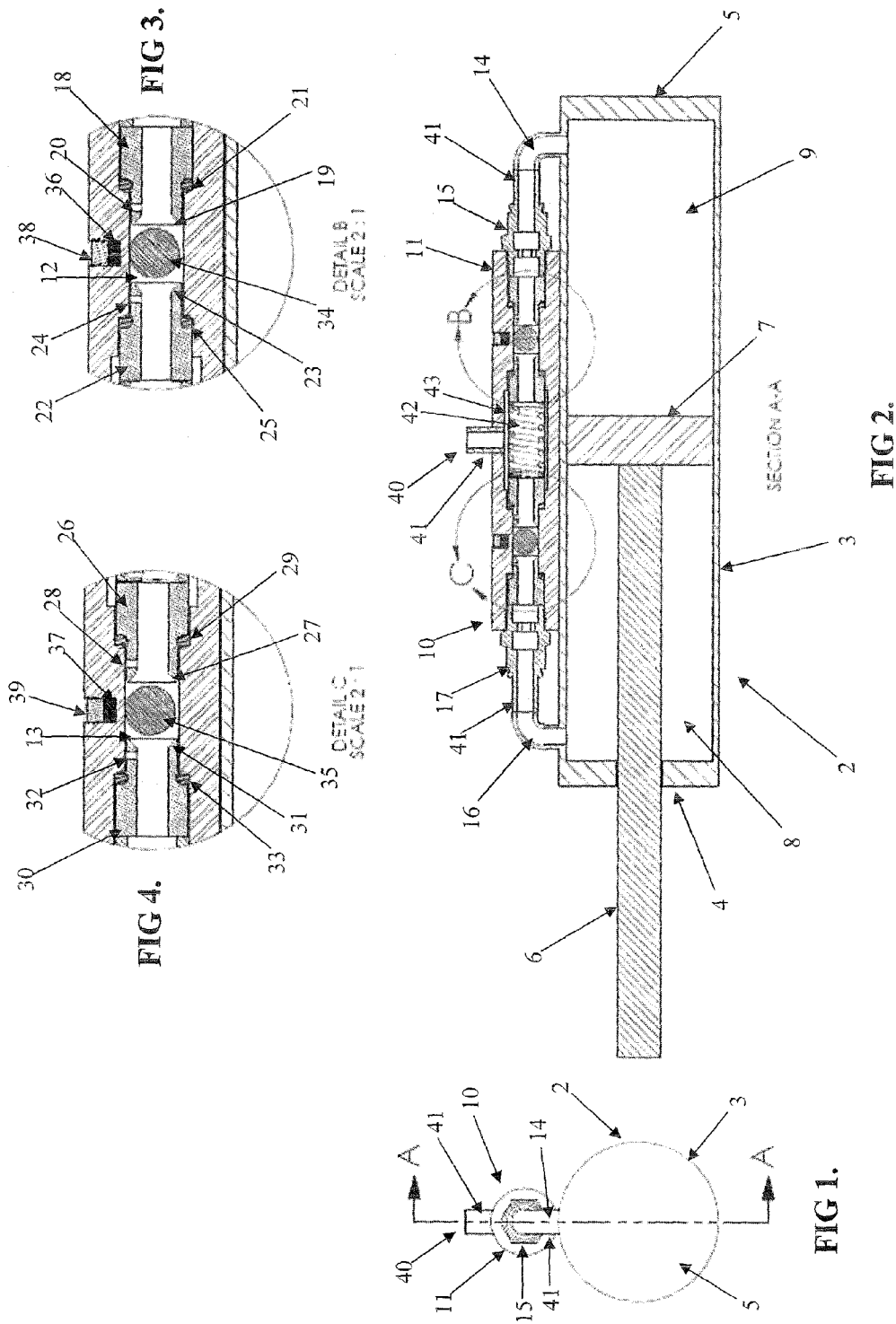

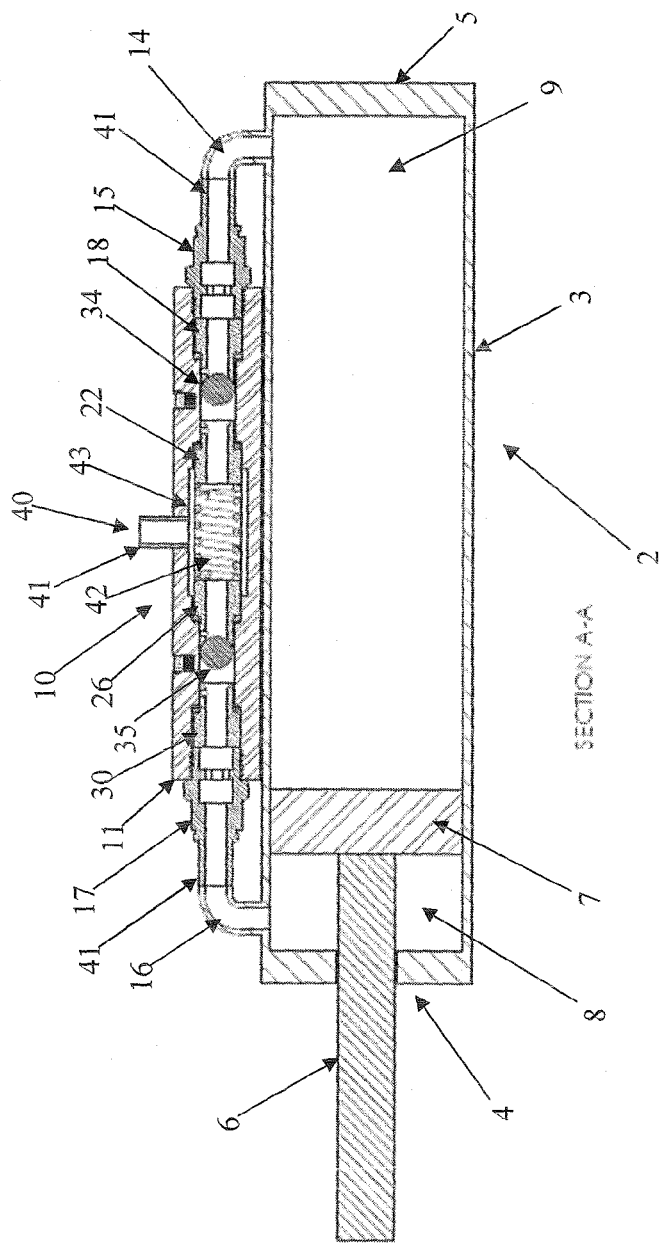
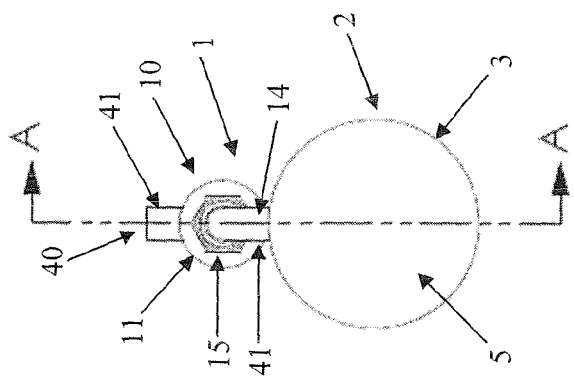
FIG 8.
FIG 7.

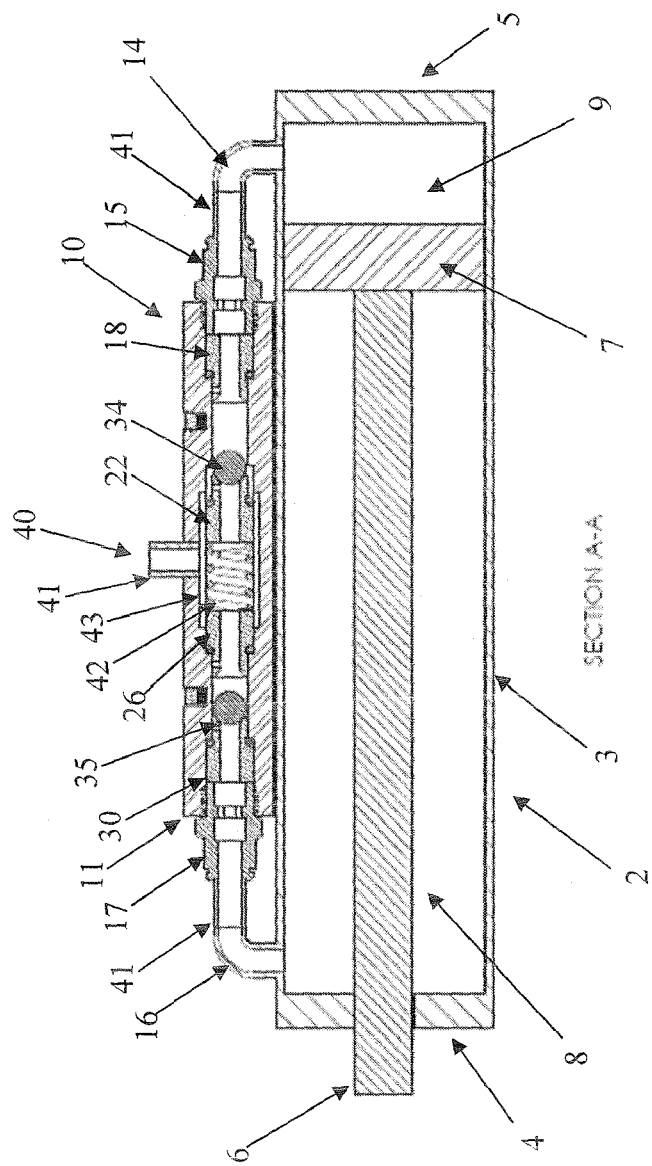
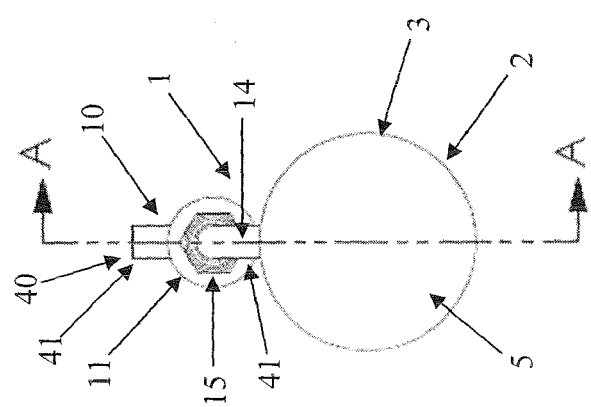
FIG 10
FIG 9.

PNEUMATIC DAMPER

CROSS REFERENCE TO RELATED APPLICATIONS

This application relates to and claims the benefit of two provisional applications filed on Nov. 14, 2008, and having application Nos. 61/199,217 and 61/199,219 and entitled "PNEUMATIC DAMPER" and "FLUID CONTROL VALVE" respectively, by the same inventors. These provisional applications are incorporated herein in their entirety by this reference. This application also relates to an application entitled "FLUID CONTROL VALVE" by the same inventors which is filed on even date herewith. This application is also incorporated herein in its entirety by this reference.

TECHNICAL FIELD OF THE INVENTION

The field of technology for this invention is the broad area of pneumatic dampers used in fluid power circuits. The invention provides a multifunctional damper apparatus which allows bi-directional flow to be controlled using a three-state configuration. The invention provides a designer with the flexibility of using a pneumatic damper to not only mitigate a shock-load fast occurring event as common dampers do, but also to effectively be decoupled from the system during uses which are not a shock-load event.

BACKGROUND OF THE INVENTION

Air seat suspension systems are expected to respond to relatively high amounts of often sudden and sometimes erratic forces. The needs of the system frequently change depending upon key variables such as driver weight, the vehicle load. The environmental conditions inside a cab of parked vehicle can vary dramatically over a short time, with temperature changes of 100 degrees F. in under an hour. Some prior art systems are too costly for wide spread deployment.

Consequently there is a need for a low cost, rugged, adjustable, three-state, bi-directional flow control device.

SUMMARY OF THE INVENTION

It is an object of the present invention to provide a damper which will not only dampen a fast-occurring shock-load in the compression and extension strokes, but also will provide minimized resistance to a mechanism during periods of minimal displacement events.

It is another object of the present invention to provide a damper with the ability to release any stored energy which was developed for the purpose of damping.

Accordingly, the present invention is a pneumatic damper comprising:

a pneumatic actuator comprising:
  an actuator body having an actuator rod end and an actuator base end;
  a piston disposed with said actuator body between said actuator rod end and said actuator base end;
  a rod, coupled to an end of the piston which is proximal to said actuator rod end;
  said rod extending out of said actuator body through an opening in said actuator rod end;
  a first port into said actuator body which is proximal to said actuator rod end;
  a second port into said actuator body which is distal to said actuator rod end;

a valve assembly comprising:
  a valve body which is substantially cylindrical with a first end and a second end and having a plurality of sections arranged in series along an axial direction between said first end and said second end, with each of said plurality of sections having a wall thickness which is different from at least one other of said plurality of sections;
  a pair of flow sealing members;
  a first pair of opposing pistons, where each of said first pair comprises a flow seal device seat and an opposing displacement resistance mating end, and is disposed around a first of said pair of flow sealing members, so that said flow seal device seat is disposed proximal to said first of said pair of flow sealing members; and said first pair are arranged serially inside said valve body along said axial dimension;
  a second pair of opposing pistons, where each of said second pair comprises a flow seal device seat and an opposing displacement resistance mating end, and is disposed around a second of said pair of flow sealing members, so that said flow seal device seat is disposed proximal to said second of said pair of flow sealing members; and said second pair are arranged serially inside said valve body along said axial dimension;
  where each piston of said first pair of opposing pistons and said second pair of opposing pistons comprises an orifice disposed between said flow seal device seat and said displacement resistance mating end which is closer to said flow seal device seat;
  an internal pressure regulating spring disposed in an axial configuration with and mating with a displacement resistance mating end of each of said first pair of opposing pistons and said second pair of opposing pistons;
  where said first end of said valve body is in fluid communication with said first port and said second end of said valve body is in fluid communication with said second port.

BRIEF DESCRIPTION OF THE DRAWINGS

The features of the invention will be better understood by reference to the accompanying drawings which illustrate presently preferred embodiments of the invention. In the drawings:

FIG. 1 is an end view of the pneumatic damper of the present invention with a single spring dual stopper valve.

FIG. 2 is a cross-sectional view taken on line A-A of FIG. 1, with the internal configuration corresponding to State I.

FIG. 3 is an enlarged detail view of the area inside the circle labeled "B" of FIG. 2.

FIG. 4 is an enlarged detail view of the area inside the circle labeled "C" of FIG. 2.

FIG. 7 is an end view of the pneumatic damper of the present invention with a single spring dual stopper valve which is identical to FIG. 1, as the differential configuration of parts are all internal and not shown.

FIG. 8 is a cross-sectional view taken on line A-A of FIG. 7, with the internal configuration corresponding to State III.

FIG. 9 is an end view of the pneumatic damper of the present invention with a single spring dual stopper valve which is identical to FIG. 1, as the differential configuration of parts are all internal and not shown.

FIG. 10 is a cross-sectional view taken on line A-A of FIG. 9, with the internal configuration corresponding to State II with internal pressure relief activated.

DETAILED DESCRIPTION

Figure 6:
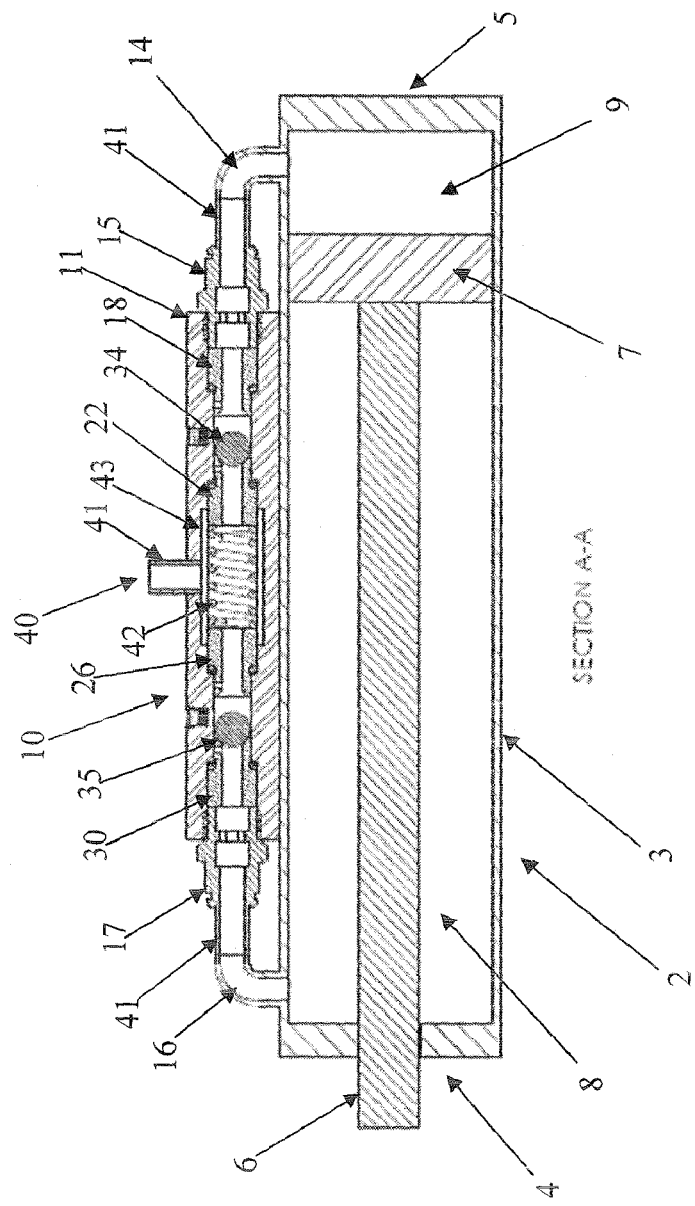
FIG. 6 is a cross-sectional view taken on line A-A of FIG. 5, with the internal configuration corresponding to State II.

This present invention relates to the design of a pneumatic damper which meets the above-described needs, achieves the previously stated objects and includes the features listed above, while realizing the already articulated advantages. The present invention is a three-state damping device, which can best be described as a system of an integrated pneumatic actuator with a custom valve. The invention utilizes the compressibility of air combined with effectively closed volume chambers to develop the necessary damping force requirements during fast-occurring shock-load events. Additionally, the damper utilizes a valve system which provides for controlled air transfer between the base end and rod end of the pneumatic actuator. The controlled air transfer utilizes the effective area of the piston face to minimize the unwanted damping force developed by the damper during events of minimal displacements. Also, the invention allows the stored energy, which is developed for damping purposes, to be exhausted elsewhere into the system, such that it does not have adverse effects on the motion of the system being damped.

In a particular application, the invention bodes well as a design solution for use in an air ride seat suspension system, and thus this application will be used herein to describe one exemplary embodiment of the invention. In a seat suspension system, the excitation events induced into the system can, for the purpose of this document, be classified as either vibration or shock. The invention optimizes the usefulness of the pneumatic damper by effectively being decoupled from the suspension system during vibration events, while being engaged during shock events.

Now referring to the drawings where like numerals refer to like matter throughout, and more particularly referring to FIGS. 1-4.

An exemplary embodiment to carry out the invention is herein described. The pneumatic damper assembly system of the present invention is the integration of two primary components: a pneumatic actuator 2 and a valve assembly 10.

The pneumatic actuator 2 comprises an actuator body 3 with an actuator rod end 4 and an actuator base end 5. The volumetric chamber of the actuator body 3 is separated by a piston 7 into two distinct volumetric chambers: a rod chamber 8 and a base chamber 9. Attached to the piston 7 is a rod 6 which protrudes from the actuator rod end 4 side of the piston 7 and extending beyond the actuator body 3. The volume contained with the two respective chambers varies by being a direct function of the location of the piston 7 within the pneumatic actuator 2. The pneumatic actuator 2 is assembled into a seat assembly by connecting the rod 6 to a moving component of a seat assembly mechanism and the actuator base end 5 to a fixed component of a seat assembly.

The valve assembly 10 contains a valve body 11 with cylindrical communication passages A 12 and B 13, each of a predetermined diameter and length, which ultimately connects port A 14 of the valve assembly 10 with port B 16 of the valve assembly 10. Port A 14 and port B 16 are in fluid communication with the pneumatic actuator 2.

Located within communication passage A 12 is a flow seal device A 34 which is of a controlled spherical dimension smaller than that of the communication passage A 12. Located at a position tangential to the flow seal device A 34 and within the valve body 11 is a magnet A 36 for retaining the flow seal device A 34 on the predetermined location. The magnet A 36 is located via a magnet adjustment screw A 38 such that the holding strength of magnet A 36 on the flow seal device A 34 can be varied. The magnet A 36 serves to retain the flow seal device A 34 on location during events of minimal airflow State I described below. Additionally, the magnet A 36 serves to "home", or return, the flow seal device A 34 back to the initial location after having been unseated due to airflow characteristics described below as State II and State III, respectively. This action of the magnet A 36 assists the flow seal device A 34 from simply pinging between the flow seal device seat C 19 and flow seal device seat D 23, also later discussed. This process supports the operation of the valve assembly 10 to more quickly achieve steady-state airflow characteristics.

Located on port A 14 side of the valve assembly 10 is fitting A 15 which ultimately connects the communication tubing 41 with the communication passage A 12. Located immediate to fitting A 15 opposite the communication tubing 41 is piston C 18 which embodies flow seal device seat C 19, orifice C 20 and piston seal C 21. Located opposite flow seal device A 34 in communication passage A 12 is piston D 22 which embodies flow seal device seat D 23, orifice D 24 and piston seal D 25.

Communication Passage A 12 and communication passage B 13 are in fluid communication via a cavity which contains internal pressure regulating spring 42 and internal pressure regulating channel 43.

Located within communication passage B 13 is a flow seal device B 35 which is of a controlled spherical dimension smaller than that of the communication passage B 13. Located at a position tangential to the flow seal device B 35 and within the valve body 11 is a magnet B 37 for retaining the flow seal device B 35 on the predetermined location. The magnet B 37 is located via a magnet adjustment screw B 39 such that the holding strength of magnet B 37 on the flow seal device B 35 can be varied. The magnet B 37 serves to retain the flow seal device B 35 on location during events of minimal airflow State I described below. Additionally, the magnet B 37 serves to "home", or return, the flow seal device B 35 back to the initial location after having been unseated due to airflow characteristics described below as State II and State III, respectively. This action of the magnet B 37 assists the flow seal device B 35 from simply pinging between the flow seal device seat E 27 and flow seal device seat F 31, also later discussed. This process supports the operation of the valve assembly 10 to more quickly achieve steady-state airflow characteristics.

Located on port B 16 side of the valve assembly 10 is fitting B 17 which ultimately connects the communication tubing 41 with the communication passage B 13. Located immediate to fitting B 17 opposite the communication tubing 41 is piston F 30 which embodies flow seal device seat F 31, orifice F 32 and piston seal F 33. Located opposite flow seal device B 35 in communication passage B 13 is piston E 26 which embodies flow seal device seat E 27, orifice E 28 and piston seal E 29.

The features of the valve assembly 10 connect the actuator rod end 4 and the actuator base end 5 of the pneumatic actuator 2. The air inlet 40 is centrally located on the valve body 11 between the actuator base end 5 and actuator rod end 4.

The preferred method to carry out the invention is herein described. The functionality of the invention is best described by three conditions:

Pneumatic Damper Decoupled for Vibration Events;

Pneumatic Damper Engaged for Compression Shock Events downward;

Pneumatic Damper Engaged for Extension Shock Events upward.

State I. Pneumatic Damper Decoupled for Vibration Events

When the pneumatic actuator 2 exists in a condition whereby the amount of, or velocity of, volumetric change of rod chamber 8 and base chamber 9, created by the piston 7 is minimal, the condition is defined as being at steady-state. This condition is established by the simultaneous velocity and displacement of a seat assembly. This condition of steady-state exists such that pressures evaluated at varying locations within the pneumatic damper assembly 1 can be considered equal to the initial system pressure. When this condition exists, the net effective damping force of the pneumatic damper assembly 1 is a direct function of the system pressure and the net effective area of the piston 7. The condition of equal pressure exists because the airflow is freely communicated between port A 14 and port B 16, with a negligible pressure drop across the flow seal device A 34 and flow seal device B 35. In this condition, magnet A 36 and magnet B 37 retain the flow seal device A 34 and flow seal device B 35 on location and promotes full flow between port A 14 and port B 16. In this steady-state condition, the airflow characteristics are controlled by the effective orifice area between the flow seal device A 34 and the communication passage A 12 and flow seal device B 35 and communication passage B 13. Flow seal device A 34 and flow seal device B 35 remain on location of the magnet A 36 and magnet B 37 until the time instant when a large enough pressure and flow gradient is developed to overcome the holding strength of the magnet A 36 and magnet B 37, causing the flow seal device A 34 and flow seal device B 35 to move within the respective communication passage A 12 and communication B 13 in a direction toward either port A 14 or port B 16.

Figure 5:
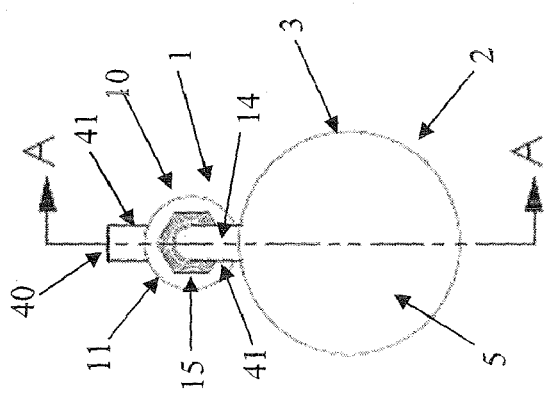
FIG. 5 is an end view of the pneumatic damper of the present invention with a single spring dual stopper valve which is identical to FIG. 1, as the differential configuration of parts are all internal and not shown.

State II. Pneumatic Damper Engaged for Compression Shock Events Downward Motion Now referring to FIGS. 5 and 6, when the seat assembly encounters a compressive shock condition, such as that which exists when driving over a pothole, the pneumatic damper assembly 1 transitions into a condition to dampen or mitigate the effects of this condition into the seat assembly. This response of the pneumatic damper assembly 1 to this compressive shock input is the result of several simultaneous events which are a direct function of airflow and volumetric changes within the pneumatic actuator 2. Because of this compressive motion, the rod 6 drives the piston 7 into the base chamber 9, thereby reducing the base chamber 9 volume. The velocity of this volume reduction generates airflow from the actuator base end 5 via port A 14 toward port B 16 with a pressure greater than the initial system pressure. This condition causes the airflow moving in the direction from port A 14 toward port B 16 to have sufficient flow and pressure to overcome the holding strength of the magnet A 36 on flow seal device A 34, whereby the flow seal device A 34 becomes seated against flow seal device seat D 23. When the flow seal device A 34 becomes fully seated, the airflow is restricted to flowing through the orifice D 24 at piston D 22. In this condition, the directional airflow characteristics are controlled by the effective orifice area of the orifice D 24 and the goodness of seat between the flow seal device A 34 and flow seal device seat D 23. At this condition of the combination of the reduced base chamber 9 volume and the size of orifice D 24, the pressure in the actuator base end 5 becomes much greater than the initial system pressure. This developed pressure acts against the actuator base end 5 face of the piston 7, thereby generating the effective damping force of the pneumatic damper assembly 1 to the seat assembly.

Simultaneous to the volume of the base chamber 9 being reduced, the volume of the rod chamber 8 is increased, creating airflow with a lower pressure than the initial system pressure. This condition at the actuator rod end 4 causes airflow moving in the direction from port A 14 toward port B 16 to have sufficient flow and pressure to overcome the holding strength of the magnet B 37 on flow seal device B 35, whereby the flow seal device B 35 becomes seated against the flow seal device seat F 31. When the flow seal device B 35 becomes fully seated, the airflow is restricted to flowing through the orifice F 32 at piston F 30. In this condition, the directional airflow characteristics are controlled by the effective orifice area of the orifice F 32 and the goodness of seat between the flow seal device B 35 and flow seal device seat F 31. The pressure reduction in the rod chamber 8 acts against the actuator rod end 4 face of the piston 7, thereby acting in combination with the damping force developed in the actuator base end 5.

Now referring to FIGS. 9 and 10, furthermore, in this state, if the air pressure developed due to the airflow restriction is great enough to overcome the force of the internal pressure regulating spring 42 acting on piston D 22, piston D 22 will travel in the direction toward fitting B 17 until piston seal D 25 travels beyond the opening of internal pressure regulating channel 43. At this instant, the generated air pressure immediately releases past piston seal D 25, flowing into the larger cavity created by the internal pressure regulating spring 42 and internal pressure regulating channel 43 and either through fitting B 17 and communication tubing 41 located at port B 16 or through communication tubing 41 located at air inlet 40, or both. This immediate airflow into volumes larger than that of base chamber 9 maintains until the generated air pressure decreases to the state whereby the force of the internal pressure regulating spring 42 acting on piston D 22 is now greater than the air pressure.

Upon a directional change from that of compression toward that of extension, the aforementioned process is reversed. This condition of reversal creates pressure differentials opposite to that previously described, and of sufficient magnitude to unseat the flow seal device A 34 and flow seal device B 35 allowing for maximum airflow through communication passage A 12 and communication passage B 13. This opportunity for maximum airflow quickly releases the developed energy from within the base chamber 9, thereby reducing the slingshot in the extension direction.

State III. Pneumatic Damper Engaged for Extension Shock Events Upward Motion Now referring to FIGS. 7 and 8, when the seat assembly encounters an extension shock condition, such as that which exists when driving over a speed bump, the pneumatic damper assembly 1 transitions into a condition to dampen or mitigate the effects of this condition into the seat assembly. This response of the pneumatic damper assembly 1 to this extension shock input is the result of several simultaneous events which are a direct function of airflow and volumetric changes within the pneumatic actuator 2. Because of this extension motion, the rod 6 drives the piston 7 into the rod chamber 8, thereby reducing the rod chamber 8 volume. The velocity of this volume reduction generates airflow from the actuator rod end 4 and port B 16 toward port A 14 with a pressure greater than the initial system pressure. This condition causes the airflow moving in the direction from port B 16 toward port A 14 to have sufficient flow and pressure to overcome the holding strength of the magnet B 37 on flow seal device B 35, whereby the flow seal device B 35 becomes seated against the flow seal device seat E 27. When the flow seal device B 35 becomes fully seated, the airflow is restricted to flowing through the orifice E 28 at piston E 26. In this condition, the directional airflow characteristics are controlled by the effective orifice area of the orifice E 28 and the goodness of seat between the flow seal device B 35 and flow seal device seat E 27. At this condition of the combination of the reduced rod chamber 8 volume and the size of orifice E 28, the pressure in the actuator rod end 4 becomes much greater than the initial system pressure. This developed pressure acts against the actuator rod end 4 face of the piston 7, thereby generating the effective damping force of the pneumatic damper assembly 1 to the seat assembly.

Simultaneous to the volume of the rod chamber 8 being reduced, the volume of the base chamber 9 is increased, creating airflow with a lower pressure than the initial system pressure. This condition at the actuator base end 5 causes airflow moving in the direction from port A 14 toward port B 16 to have sufficient flow and pressure to overcome the holding strength of the magnet A 36 on flow seal device A 34, whereby the flow seal device A 34 becomes seated against the flow seal device seat C 19. When the flow seal device A 34 becomes fully seated, the airflow is restricted to flowing through the orifice C 20 at piston C 18. In this condition, the directional airflow characteristics are controlled by the effective orifice area of the orifice C 20 and the goodness of seat between the flow seal device A 34 and flow seal device seat C 19. The pressure reduction in the base chamber 9 acts against the actuator base end 5 face of the piston 7, thereby acting in combination with the damping force developed in the actuator rod end 4.

Furthermore, in this state, if the air pressure developed due to the airflow restriction is great enough to overcome the force of the internal pressure regulating spring 42 acting on piston E 26, piston E 26 will travel in the direction toward fitting A 15 until piston seal E 29 travels beyond the opening of internal pressure regulating channel 43. At this instant, the generated air pressure immediately releases past piston seal E 29, flowing into the larger cavity created by the internal pressure regulating spring 42 and internal pressure regulating channel 43 and either through fitting A 15 and communication tubing 41 located at port A 14 or through communication tubing 41 located at air inlet 40, or both. This immediate airflow into volumes larger than that of rod chamber 8 maintains until the generated air pressure decreases to the state whereby the force of the internal pressure regulating spring 42 acting on piston E 26 is now greater than the air pressure.

Upon a directional change from that of extension toward that of compression, the aforementioned process is reversed. This condition of reversal creates pressure differentials opposite to that previously described, and of sufficient magnitude to unseat the flow seal device B 35 and flow seal device A 34 allowing for maximum airflow through communication passage B 13 and communication passage A 12. This opportunity for maximum airflow quickly releases the developed energy from within the rod chamber 8, thereby reducing the slingshot in the compressive direction.

After studying the invention, it will become evident that the design allows flexibility for a specific application. State I can be controlled by changing the effective orifice areas between the flow seal device A 34 and communication passage A 12, and flow seal device B 35 and communication passage B 13, as well as the length for which the flow seal device A 34 and flow seal device B 35 must travel. Additionally, the holding strength of the magnet A 36 and magnet B 37 can be set to allow a weaker or stronger release of the flow seal device A 34 and flow seal device B 35. Furthermore, the magnet A 36 and magnet B 37 can be replaced with an electromagnet allowing further flexibility and control to be induced into the invention. It also recognized that the airflow and pressure response within the pneumatic damper assembly 1 is a primary function of the corresponding changes in the in-line streaming airflow characteristics and can be used to provide intelligence for an electronic controller. The intelligence could be used for communication with the electromagnet, as well as other controllable parameters to provide enhanced control over the pneumatic damper assembly 1 response.

States II and III can be independently controlled by changing the airflow restrictions developed by orifice C 20, orifice D 24, orifice E 28 and orifice F 32, respectively. Furthermore, the goodness of seat between the flow seal device A 34 and the flow seal device seat C 19 and flow seal device seat D 23, as well as flow seal device B 35 and flow seal device seat E 27 and flow seal device seat F 31, respectively govern airflow characteristics.

The goodness of seat between the flow seal device A 34 and the flow seal device seat C 19 and flow seal device seat D 23, as well as flow seal device B 35 and flow seal device seat E 27 and flow seal device seat F 31, can also be governed by the geometry of the flow seal device A 34 and flow seal device B 35. Furthermore, the geometry can also promote the ability to more easily bias the flow seal device A 34 toward either flow seal device seat C 19 or flow seal device seat D 23, or flow seal device B 35 toward either flow seal device seat E 27 or flow seal device seat F 31 especially when incorporating an electromagnet into the design. Additionally, the flow seal device A 34 and flow seal device B 35 geometry can be such that the flow seal device A 34 and flow seal device B 35 may include a flow seal device core that is either magnetic or non-magnetic. By using a flow seal device core, additional control and goodness of seat can be achieved. Furthermore, an alternate material for the flow seal device A 34 and flow seal device B 35 may be of a softer material than the seat to gain additional positive seating characteristics, such as that commonly found in industrial valve and valve seats.

The materials and processes used within the invention are standard to the industry relating to pneumatic actuators and fluid control valves. For example, the pneumatic actuator 2 may be a COTS pneumatic cylinder or possibly made from extruded aluminum or stainless steel tubing. The valve body 11 may be machined from brass or plastic, or injection molded from plastic. Likewise, the piston C 18, piston D 22, piston E 26 and piston F 30 can be machined from brass or plastic, or injection molded. If manufactured from metal, brass is attractive for many reasons; i.e., relatively low cost, ease of machining, etc.; however, other metals and composite materials could be equally suitable.

Figures 11, 12:
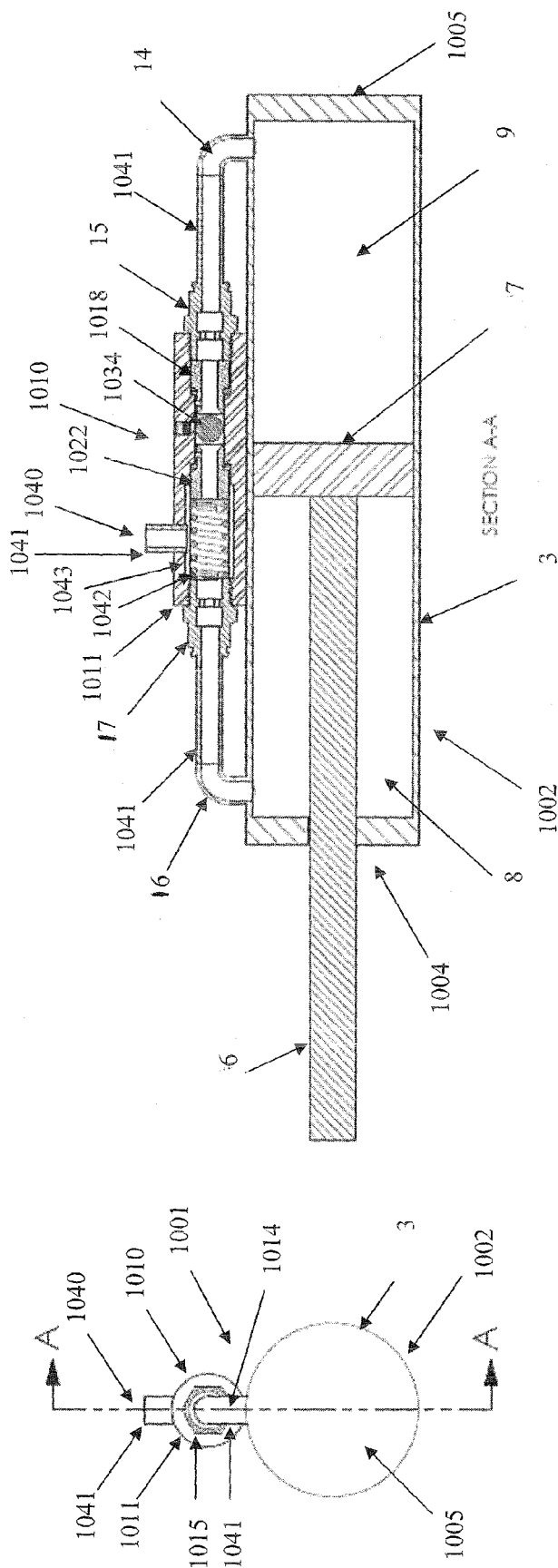
FIG. 11 is an end view of the pneumatic damper of the present invention with a single spring and a single stopper valve which is similar, but not identical to FIG. 1.
FIG. 12 is a cross-sectional view taken on line A-A of FIG. 11, with the internal configuration corresponding to State I.

Now referring to FIGS. 11 and 12, another embodiment exists whereby the pneumatic damper assembly 1001 contains a valve assembly 1010, which can be configured to utilize a single internal pressure relief spring 1042 to regulate the maximum allowable pressure developed in either the actuator rod end 1004 or actuator base end 1005 of the pneumatic actuator 1002.

The embodiment of FIGS. 11 and 12 is configured to regulate maximum pressure developed on the actuator base end 1005.

Figure 14:
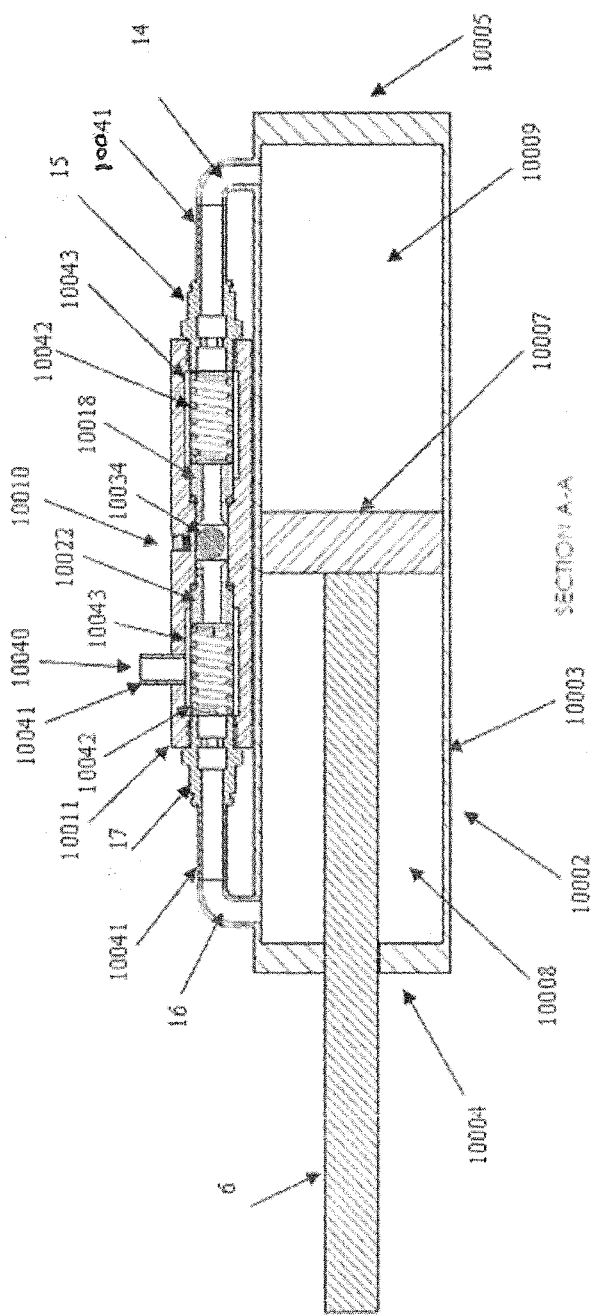
FIG. 14 is a cross-sectional view taken on line A-A of FIG. 13, with the internal configuration corresponding to State I.
Figure 13:
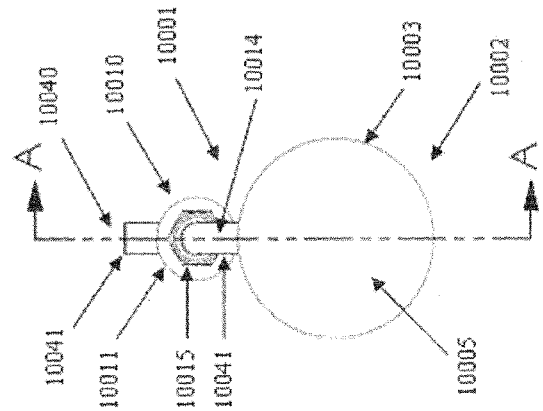
FIG. 13 is an end view of the pneumatic damper of the present invention with a dual spring and a single stopper valve which is similar, but not identical to FIG. 11.

Now referring to FIGS. 13 and 14, another embodiment exists whereby the pneumatic damper assembly 10001 contains a valve assembly 10010, which can be configured to utilize multiple internal pressure relief springs 10042 to regulate the maximum allowable pressure developed in either the actuator rod end 10004 or actuator base end 10005 of the pneumatic actuator 10002.

It is also recognized that embodiments exist where the invention can be incorporated with other fluid control components, such as that of a height control valve commonly found within suspension systems used for cabs, chassis, etc.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A pneumatic damper comprising:
   a pneumatic actuator comprising:
   an actuator body having an actuator rod end and an actuator base end;
   a piston disposed with said actuator body between said actuator rod end and said actuator base end;
   a rod, coupled to an end of the piston which is proximal to said actuator rod end;
   said rod extending out of said actuator body through an opening in said actuator rod end;
   a first port into said actuator body which is proximal to said actuator rod end;
   a second port into said actuator body which is distal to said actuator rod end;
   a bidirectional valve assembly with bidirectional pressure relief capabilities, the valve assembly comprising:
   a valve body which is substantially cylindrical with a first end and a second end and having a plurality of sections arranged in series along an axial direction between said first end and said second end, with each of said plurality of sections having a wall thickness which is different from at least one other of said plurality of sections;
   a pair of flow sealing members;
   a first pair of opposing valve seats, where each of said first pair comprises a flow seal device seat and an opposing displacement resistance mating end, and is disposed around a first of said pair of flow sealing members, so that said flow seal device seat is disposed proximal to said first of said pair of flow sealing members; and said first pair are arranged serially inside said valve body along said axial dimension, and one of said first pair of opposing valve seats is movable within the valve body;
   a second pair of opposing valve seats, where each of said second pair comprises a flow seal device seat and an opposing displacement resistance mating end, and is disposed around a second of said pair of flow sealing members, so that said flow seal device seat is disposed proximal to said second of said pair of flow sealing members; and said second pair are arrange serially inside said valve body along said axial dimension, and one of said second pair of opposing valve seats is movable within the valve body;
   where each piston of said first pair of opposing valve seats and said second pair of opposing valve seats comprises an orifice disposed between said flow seal device seat and said displacement resistance mating end which is closer to said flow seal device seat;
   an internal pressure regulating spring disposed in an axial configuration with and mating with a displacement resistance mating end of each of said first pair of opposing valve seats and said second pair of opposing valve seats; and
   where said first end of said valve body is in fluid communication with said first port and said second end of said valve body is in fluid communication with said second port.

2. A pneumatic damper comprising:
   an air shock comprising:
   an actuator body having an actuator rod end and an actuator base end;
   a piston disposed with said actuator body between said actuator rod end and said actuator base end;
   a rod, coupled to an end of the piston which is proximal to said actuator rod end;
   said rod extending out of said actuator body through an opening in said actuator rod end;
   a first port into said actuator body which is proximal to said actuator rod end;
   a second port into said actuator body which is distal to said actuator rod end;
   a valve assembly comprising:
   a valve body which is substantially cylindrical with a first end and a second end and having a plurality of sections arranged in series along an axial direction between said first end and said second end, with each of said plurality of sections having a wall thickness which is different from at least one other of said plurality of sections;
   a flow sealing member;
   a first pair of opposing valve seats, where each of said first pair comprises a flow seal device seat and an opposing displacement resistance mating end, and is disposed around said flow sealing member, so that said flow seal device seat is disposed proximal to said flow sealing member; and said first pair are arranged serially inside said valve body along said axial dimension, and one of said first pair of opposing valve seats is movable within the valve body;
   where each piston of said first pair of opposing valve seats comprises an orifice disposed between said flow seal device seat and said displacement resistance mating end which is closer to said flow seal device seat;
   an internal pressure regulating spring disposed in an axial configuration with and mating with a displacement resistance mating end of one of said first pair of opposing valve seats; and
   where said first end of said valve body is in fluid communication with said first port and said second end of said valve body is in fluid communication with said second port.

3. The pneumatic damper of claim 2 further comprising a magnet disposed so as to tend to hold said flow sealing member at a predetermined home position when pressure within said valve body is below a predetermined threshold.

4. The pneumatic damper of claim 3 wherein said first pair of opposing valve seats further comprises one valve seat which remains stationary with respect to the valve body.

5. The pneumatic damper of claim 4 further comprising a pressure relief channel configured to remove pressure from within said valve body only when one of said first pair of pistons is pressed by pressure beyond a predetermined position, so that air is permitted to flow through the pressure relief channel.

6. A pneumatic damper comprising:
- a pneumatic actuator comprising:
- an actuator body having an actuator rod end and an actuator base end;
- a piston disposed with said actuator body between said actuator rod end and said actuator base end;
- a rod, coupled to an end of the piston which is proximal to said actuator rod end;
- said rod extending out of said actuator body through an opening in said actuator rod end;
- a first port into said actuator body which is proximal to said actuator rod end;
- a second port into said actuator body which is distal to said actuator rod end;
- a valve assembly comprising:
- a valve body which is substantially cylindrical with a first end and a second end and having a plurality of sections arranged in series along an axial direction between said first end and said second end, with each of said plurality of sections having a wall thickness which is different from at least one other of said plurality of sections;
- a flow sealing member, comprising a metallic ball;
- a first pair of opposing valve seats, where each of said first pair comprises a flow seal device seat and an opposing displacement resistance mating end, and is disposed around said flow sealing member, so that said flow seal device seat is disposed proximal to said flow sealing member; and said first pair is arranged serially inside said valve body along said axial dimension, and one of said first pair of opposing valve seats is movable within the valve body;
- where each piston of said first pair of opposing valve seats comprises an orifice disposed between said flow seal device seat and said displacement resistance mating end which is closer to said flow seal device seat;
- a pair of internal pressure regulating springs disposed in an axial configuration with and mating with a displacement resistance mating end of each of said first pair of opposing valve seats;
- where said first end of said valve body is in fluid communication with said first port and said second end of said valve body is in fluid communication with said second port; and
- a plurality of pressure relief channels configured to remove pressure from within said valve body only when each of said first pair of valve seats is pressed by pressure beyond a predetermined position, so that air is permitted to flow through the pressure relief channel.

7. The pneumatic damper of claim 6 further comprising a magnet disposed so as to tend to hold said flow sealing member at a predetermined home position when pressure within said valve body is below a predetermined threshold.

* * * * *